(12) United States Patent
Richard et al.

(10) Patent No.: US 6,836,590 B2
(45) Date of Patent: Dec. 28, 2004

(54) OPTICAL SUBASSEMBLY WITH PORT CONFIGURATION

(75) Inventors: Jenkin A. Richard, Palo Alto, CA (US); Eric V. Chamness, Menlo Park, CA (US); David F. Moore, San Carlos, CA (US); George H. Guan, Fremont, CA (US); Steven J. Benerofe, San Francisco, CA (US); Anjul K. Katare, Fremont, CA (US); Cameron D. Hinman, Woodside, CA (US); Qunwen Leng, San Jose, CA (US)

(73) Assignee: Oplink Communications, Inc., San Jose, CA (US)

( * ) Notice: Subject to any disclaimer, the term of this patent is extended or adjusted under 35 U.S.C. 154(b) by 207 days.

(21) Appl. No.: 10/206,493

(22) Filed: Jul. 26, 2002

(65) Prior Publication Data

US 2004/0017970 A1 Jan. 29, 2004

(51) Int. Cl.[7] .................................................. G02B 6/34
(52) U.S. Cl. .......................... 385/36; 385/31; 359/831
(58) Field of Search ............................... 385/24, 36, 39

(56) References Cited

U.S. PATENT DOCUMENTS 4,693,544 A * 9/1987 Yamasaki et al. ............. 385/47
5,583,683 A * 12/1996 Scobey .......................... 398/79
5,859,717 A * 1/1999 Scobey et al. ................ 398/79
6,118,912 A * 9/2000 Xu ................................ 385/24
6,301,407 B1 * 10/2001 Donaldson ................... 385/34

* cited by examiner

Primary Examiner—Phan T. H. Palmer
Assistant Examiner—Jennifer Doan
(74) Attorney, Agent, or Firm—Fish & Richardson P.C.

(57) ABSTRACT

An optical subassembly utilizes a core with a first, second, and third faces. The first and second faces are coupled, non-parallel, and non-co-planar for changing a path of a beam, and their intersection defines an axis. Filters are coupled to the third face. The light path traverses between the first or second face and each filter such that, at each filter, no portion of the light path interferes with any other portion of the light path. The light path also traverses the core in a direction along the axis. This is facilitated by the light path traversing an external surface of a filter at an angle. The device includes adjustable ports residing at the same side of the device. Filters are coupled to the core and optically coupled to the adjustable ports. The light path travels down the core and exit or enter the device via the adjustable ports.

31 Claims, 9 Drawing Sheets

OPTICAL SUBASSEMBLY WITH PORT CONFIGURATION

FIELD OF THE INVENTION

The present invention relates to optical subassemblies.

BACKGROUND OF THE INVENTION

FIG. 1 illustrates an exemplary conventional optical subassembly. The device 100 comprises a glass slab 102, a plurality of filters 104a–104d coupled to the glass slab 102, an input/output port 106 optically coupled to the glass slab 102, and a plurality of ports 108a–108d, each optically coupled to a filter 104a–104d. Each filter 104a–104d transmits a particular wavelength or range of wavelengths, i.e., a channel, while reflecting the remaining channels. An optical fiber can be positioned at the ports 106 and 108a–108d.

For example, as a demultiplexer, the input/output port 106 transmits a beam comprising channels $\lambda_1$–$\lambda_4$ through the glass slab 102 to the filter 104a. Filter 104a transmits $\lambda_1$ to port 108a and reflects $\lambda_2$–$\lambda_4$ through the glass slab 102 to filter 104b. Filter 104b transmits $\lambda_2$ to port 108b and reflects $\lambda_3$–$\lambda_4$ through the glass slab 102 to filter 104c. Filter 104c transmits $\lambda_3$ to port 108c and reflects $\lambda_4$ through the glass slab 102 to filter 104d. Filter 104d transmit $\lambda_4$ to port 108d. In this manner, the device 100 functions as a demultiplexer. As would be understood by one of ordinary skill in the art, the beam paths are approximately the same when the device 100 functions as a multiplexer except the channels are traveling in the opposite direction.

However, because the ports 108a and 108c are positioned at a different side of the device 100 than ports 106, 108b, and 108d, the device 100 can be difficult to fit onto a board. One or more of the optical fibers at the ports 106 and 108a–108d may need to be bent in order to accomplish the desired fit. This is especially difficult at the corners of the board.

Accordingly, there exists a need for a multiplexer/demultiplexer device with an improved port configuration. The improved port configuration should have all beams entering and exiting at the same side of the device, making the device easier to fit onto a board. The present invention addresses such a need.

SUMMARY OF THE INVENTION

The present invention provides an optical subassembly with an improved port configuration. The improved port configuration has all beams entering and exiting at the same side of the device.

In one aspect of the present invention, the device utilizes a core comprising a first and a second face, where the first and second faces are coupled, non-parallel, and non-coplanar for changing a path of a beam.

In another aspect of the present invention, filters are coupled to a third face of the core. An axis of the core is defined by the intersection of the first and second faces of the core. The light path traverses between the first or second face and each filter, such that, at each filter, no portion of the light path interferes with any other portion of the light path. In addition, the light path traverses the core in a direction along this axis.

In another aspect of the present invention, the device further comprises a common port and a plurality of ports residing at the same side of the device.

In another aspect of the present invention, the filters are optically coupled to the plurality of ports.

In another aspect of the present invention, the positions of the ports are adjustable to facilitate alignment.

In an exemplary embodiment, the positions of the ports are adjusted to facilitate alignment by first aligning the common port to a target at one of the plurality of ports, then aligning the plurality of ports to the common port.

In an exemplary embodiment, an optical device is provided, which comprises: a core, comprising a plurality of reflective faces; a plurality of filters, wherein each filter corresponds to one of a plurality of channels, wherein each filter is optically coupled to at least one of the plurality of reflective surfaces; a common port optically coupled to the core for transmitting a beam comprising the plurality of channels; and a plurality of ports, wherein each port is optically coupled to one of the plurality of filters, wherein each port transmits one of the plurality of channels, wherein the core and the plurality of filters multiplex the plurality of channels or demultiplex the beam, wherein the common port and the plurality of ports reside at a same side of the device.

In another exemplary embodiment, a multiplexing device is provided, which comprises: a core, comprising a plurality of reflective faces; a plurality of ports at a side of the device, wherein each port transmits one of a plurality of channels; a plurality of filters coupled to the core, wherein each filter corresponds to one of the plurality of channels, wherein each filter is optically coupled to the port that transmits its corresponding channel, wherein each of the plurality of filters transmits its corresponding channel to one of the plurality of reflective surfaces, wherein each channel is reflected to a common port such that the plurality of channels is multiplexed; and the common port at the side of the device, wherein the common port is optically coupled to the core for receiving the multiplexed plurality of channels.

In another exemplary embodiment, a demultiplexing device is provided, which comprises: a core, comprising a plurality of reflective faces; a common port optically coupled to the core at a side of the core for transmitting a beam comprising a plurality of channels to one of the plurality of reflective faces; a plurality of filters coupled to the core, wherein each filter corresponds to one of the plurality of channels, wherein each of the plurality of filters receives its corresponding channel from one of the plurality of reflective surfaces, wherein each filter transmits its corresponding channel and reflects any other channel; and a plurality of ports at the side of the device, wherein each port is optically coupled to one of the plurality of filters, wherein each port receives the corresponding channel transmitted by the filter.

Exemplary embodiments of the present invention may use one or more of the aspects described above, alone, or in combination.

DETAILED DESCRIPTION

The present invention provides an optical subassembly with an improved port configuration. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

To more particularly describe the features of the present invention, please refer to FIGS. 2A through 5 in conjunction with the discussion below.

Figure 1:
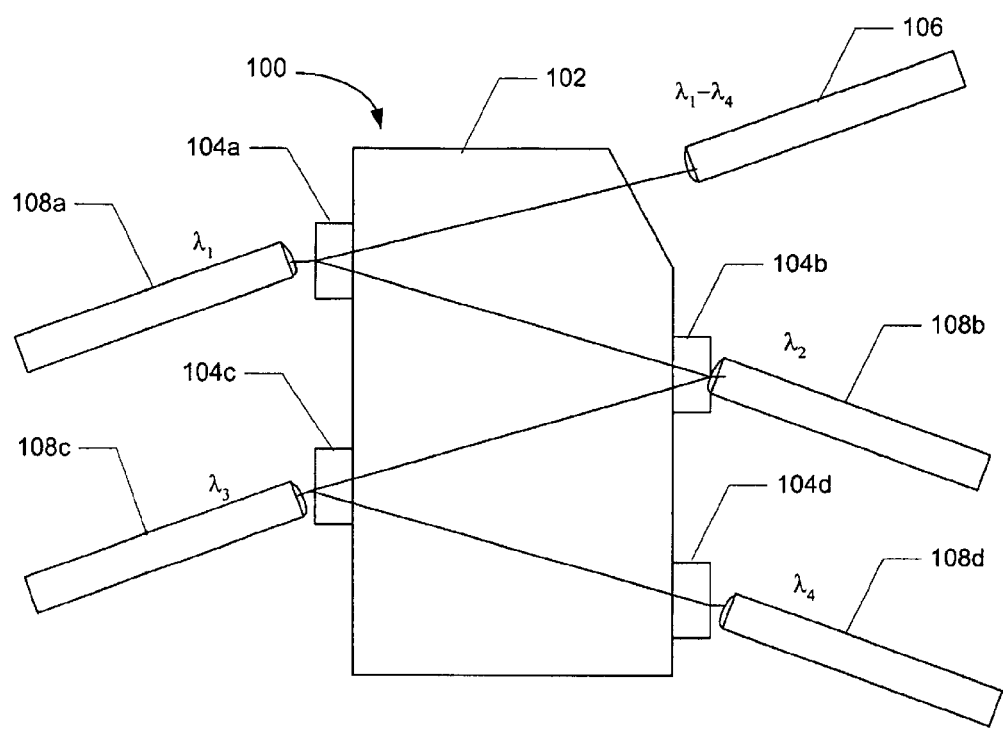
FIG. 1 illustrates an exemplary conventional optical subassembly.
Figure 2A:
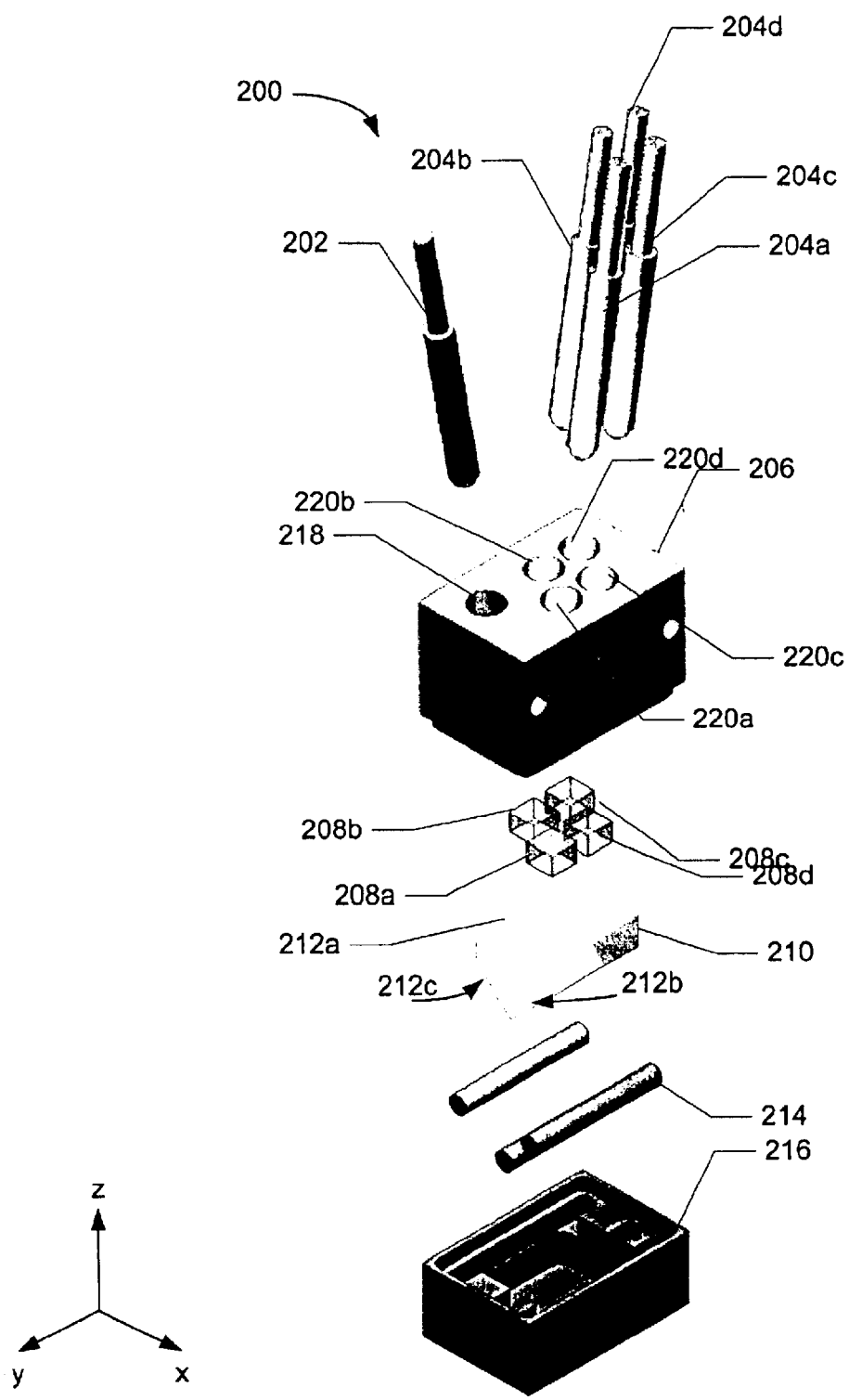
FIGS. 2A–2E illustrate an exemplary embodiment of an optical subassembly.
Figure 2B:
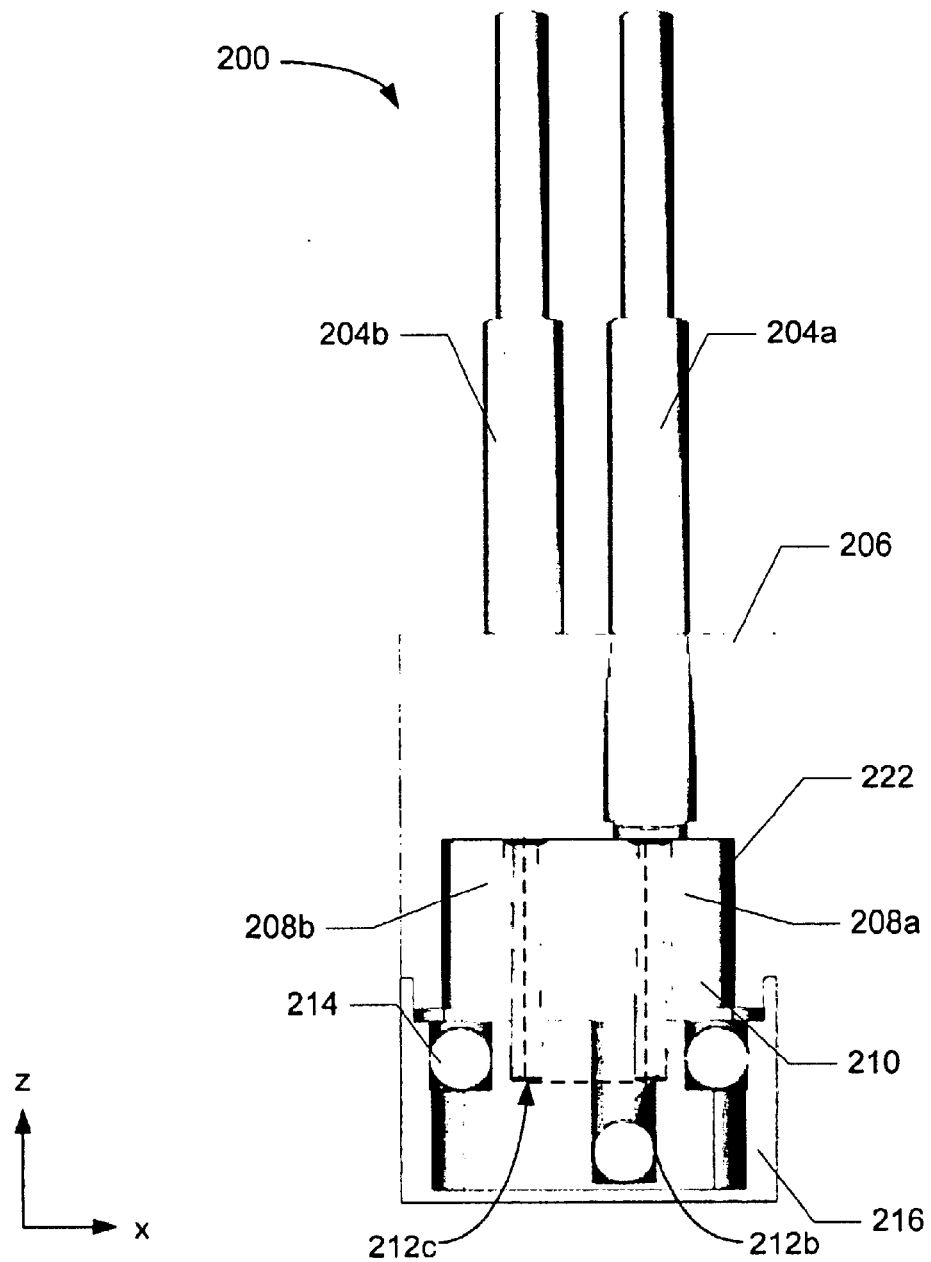
Figure 2C:
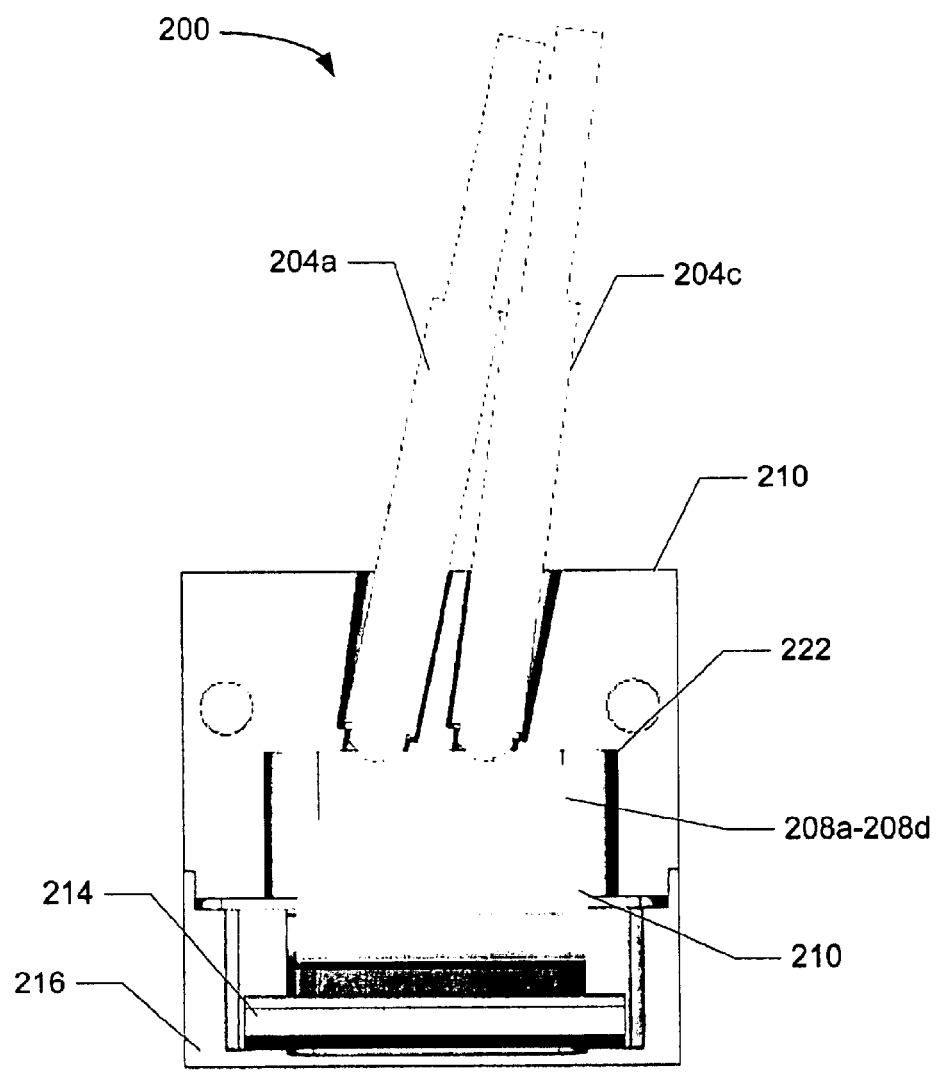
Figure 2D:
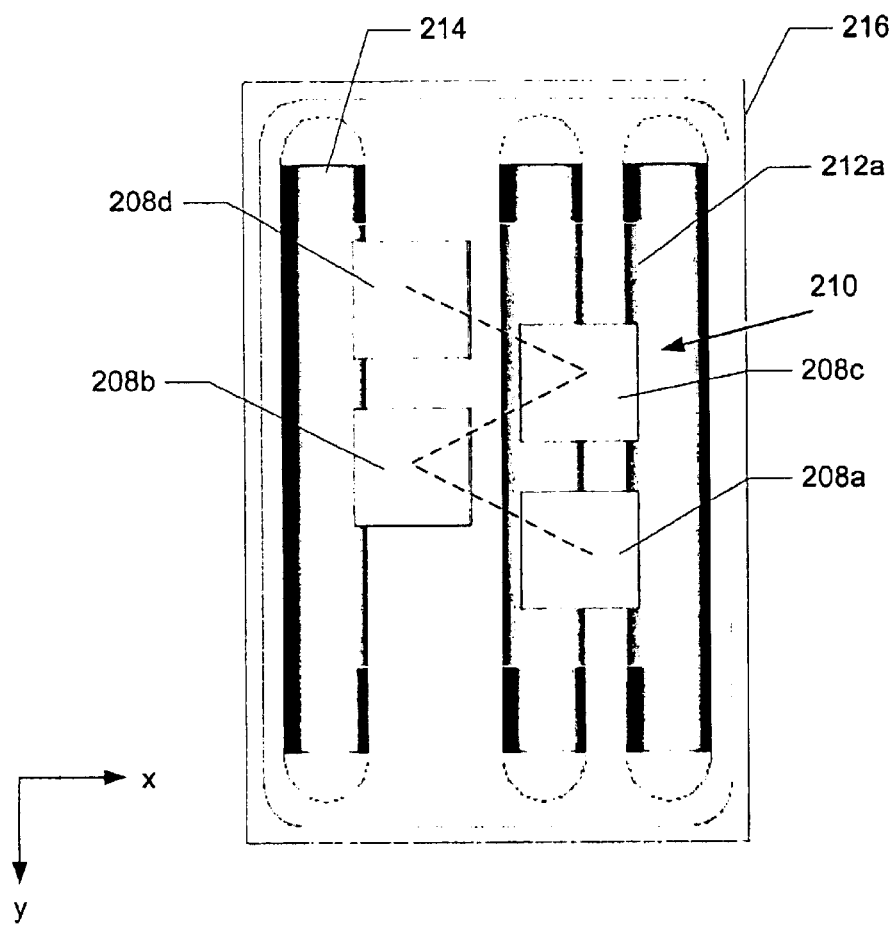
Figure 2E:
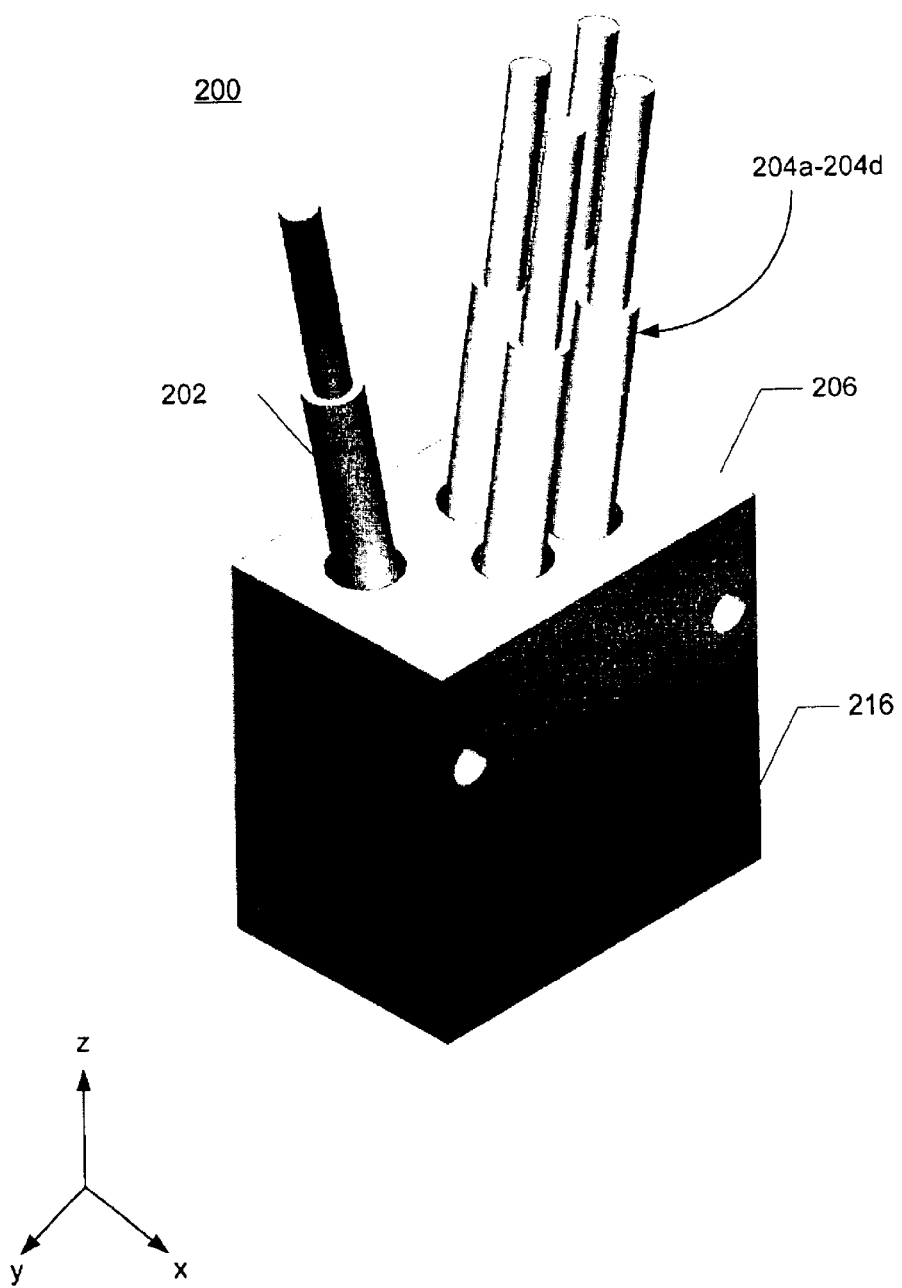

FIGS. 2A–2E illustrate an exemplary embodiment of an optical subassembly 200. FIG. 2A illustrates an exploded isometric view; FIG. 2B illustrates a front cross-sectional view; FIG. 2C illustrates a side cross-sectional view; FIG. 2D illustrates a top cross-sectional view; and FIG. 2E illustrates an assembled isometric view of the device 200.

The optics comprising the device 200 includes a common port 202, a plurality of ports 204a–204d, a plurality of filters 208a–208d, and a core 210. Each port 202 and 204a–204d comprises a collimator coupled to an optical fiber, waveguide, or other light guiding medium. The position of each collimator is adjustable for alignment purposes. The core 210 comprises a first face 212b and a second face 212c. The first and second faces 212b–212c are coupled, non-parallel, and non-co-planar for changing a path of a beam. The core 210 further comprises a third face 212a, to which the filters 208a–208d are coupled. The intersection of the first and second faces 212b–212c defines an axis of the core 210. In this embodiment, the axis is parallel to the y-axis. A light path traverses between the first 212b or second 212c face and each filter 208a–208d, such that, at each filter 208a–208d, no portion of the light path interferes with any other portion of the light path. Also, the light path traverses the core 210 in a direction along the y-axis. Thus, in this embodiment, a "zig-zag" light path results, as illustrated in FIG. 2D. To facilitate this light path, it traverses an external surface of a filter at an angle. For example, the angle can be approximately 10° relative to the external surface's normal axis.

In the exemplary embodiment, the core 210 is a glass prism with a base face as the third face 212a and side faces as the first and second faces 212b–212c. Other shapes may be used for the core 210. The side faces 212b–212c are either coated with a reflective coating or uses total internal reflection (TIR) to traverse light through the core 210, as described further below. The core 210 can also be doped to obtain desired characteristics, such as amplification or attenuation.

The filters 208a–208d are coupled to the base face 212a of the core 210 using any variety of methods, such as epoxy, heat fusion, and solder. Each filter 208a–208d transmits a particular channel in a beam and reflects the remaining channels. Each filter 208a–208d comprises a coating either on the surface coupled to the core 210 or on the external surface away from the core 210. In addition, either surface of each filter 208a–208d may be coated with an antireflective coating. The base face 212a of the core 210 may also be coated with the anti-reflective coating.

For example, as a demultiplexer, a beam comprising channels $\lambda_1$–$\lambda_4$ enters the device 200 through the common port 202 at an angle. In the exemplary embodiment, the angle is such that the beam enters the core 210 at approximately 10° relative to the z-axis. The beam comprising $\lambda_1$–$\lambda_4$ enters the core 210 from the port 202 and reflects from the side face 212c. Since the side face 212c is coated, the beam is reflected to the side face 212b. Since the side face 212b is also coated, the beam is further reflected to the filter 208a.

The filter 208a transmits $\lambda_1$ to the port 204a. Because the beam comprising $\lambda_1$–$\lambda_4$ enters the device 200 at an angle, the filter 208a transmits $\lambda_1$ at an angle. Thus, the port 204a is also positioned at an angle relative to the z-axis such that the port 204a is properly aligned to receive $\lambda_1$. Ports 204b–204d are also positioned for alignment to receive their respective channels. The filter 208a reflects $\lambda_2$–$\lambda_4$ to the side face 212b. The side face 212b reflects $\lambda_2$–$\lambda_4$ to the side face 212c, which in turn reflects these channels to the filter 208b. (See FIG. 2B.)

The filter 208b transmits $\lambda_2$ to the port 204b and reflects $\lambda_3$–$\lambda_4$ to the side face 212c. The side face 212c reflects $\lambda_3$–$\lambda_4$ to the filter 208c. The filter 208c transmits $\lambda_3$ to the port 204c and reflects $\lambda_4$ to the side face 212b. The side face 212b reflects $\lambda_4$ to the filter 208d. The filter 208d transmits $\lambda_4$ to the collimator 204d.

Because $\lambda_1$–$\lambda_4$ enter the device 200 at an angle, the channels travel down the core 210 along the y-axis (see FIG. 2D), and exits the core 210 at an angle. Each of the ports 204a–204d is positioned at an angle for alignment to properly receive their respective channels. The ports 202 and 204a–204d are each adjustable by rotation of the collimator's "tail" (the end distal to the filters 208a–208d) about the θy- and θx-axes and by translation along the x- and y-axes.

As is understandable to one of ordinary skill in the art, the device 200 can function as multiplexer with $\lambda_1$–$\lambda_4$ having similar paths through the device 200 but in the opposite direction. Channels $\lambda_1$, $\lambda_2$, $\lambda_3$, and $\lambda_4$ are input into the device 200 through ports 204a, 204b, 204c, and 204d, respectively. The channel $\lambda_4$ is transmitted by filter 208d to side face 212c. Side face 212c reflects $\lambda_4$ to the side face 212b. Side face 212b reflects $\lambda_4$ to filter 208c.

Filter 208c transmits $\lambda_3$ and reflects $\lambda_4$ to side face 212b. Side face 212b reflects $\lambda_3$–$\lambda_4$ to side face 212c. Side face 212c reflects $\lambda_3$–$\lambda_4$ to filter 208b. Filter 208b transmits $\lambda_2$ and reflects $\lambda_3$–$\lambda_4$ to side face 212c. Side face 212c reflects $\lambda_2$–$\lambda_4$ to side face 212b. Side face 212b reflects $\lambda_2$–$\lambda_4$ to filter 208a. Filter 208a transmits $\lambda_1$ and reflects $\lambda_2$–$\lambda_4$ to side face 212b. Side face 212b reflects $\lambda_1$–$\lambda_4$ to side face 212c. Side face 212c reflects $\lambda_1$–$\lambda_4$ to the common port 202.

In this manner, channels in a beam is demultiplexed or multiplexed with the ports 202 and 204a–204d. In this exemplary embodiment, the ports 202 and 204a–204d are on the same side of the device 200. This allows the device 200 to fit more easily onto a board. For example, the device 200 can be placed at a corner of the board without requiring any of the optical fibers at the ports 202 and 204a–204d to be bent. Alternatively, a retroreflector or mirror may be used in place of the common port 202. The common port 202 is repositioned to a side of the device 200 opposite to the other ports 204a–204d. The retroreflector redirects a light beam to or from the newly placed common port 202.

FIGS. 2A–2E also illustrate an exemplary embodiment of a packaging for the device 200. The packaging comprises a chassis 206, bars 214, and a chassis base 216. The chassis 206 comprises metal with bores 218 and 220a–d. The "head" (the end proximate to the filters 208a–208d) of the collimator of the common port 202 is coupled to the chassis 206 within the bore 218. The heads of the collimators of the ports 204a–204d are each coupled to the chassis 206 within one of the bores 220a–220d. The coupling can be accomplished through the wicking of thermally cured adhesive, the use of ultraviolet light cured adhesive, use of glue around the edges of the ports 204a–204d so that there is no glue in the optical path, solder, epoxy, welds, or any other coupling means. In the exemplary embodiment, the bores 218 and 220a–220d are tapered, with the top of the bore being wider than the bottom of the bore, to allow for the rotational alignment of the ports 202 and 204a–204d. The width of the bores 218 and 220a–220d are such that translational alignment of the ports 202 and 204a–204d are possible. Other configurations of the bores 218 and 220a–220d are possible. The chassis 206 also comprises an opening (not shown) at the bottom of the chassis 206 that lead to a cavity 222 with the chassis 206 (see FIGS. 2B–2C).

The packaging further comprises bars 214 and a chassis base 216. The bars 214 reside within the chassis base 216, so that the side faces 212b–212c of the core 210 abut against the bars 214 and is properly supported. The chassis base 216, bars 214, core 210, and filters 208a–208d are then placed within the cavity 222 through the opening. An assembled and packaged device 200 is illustrated in FIG. 2E.

Figure 3:
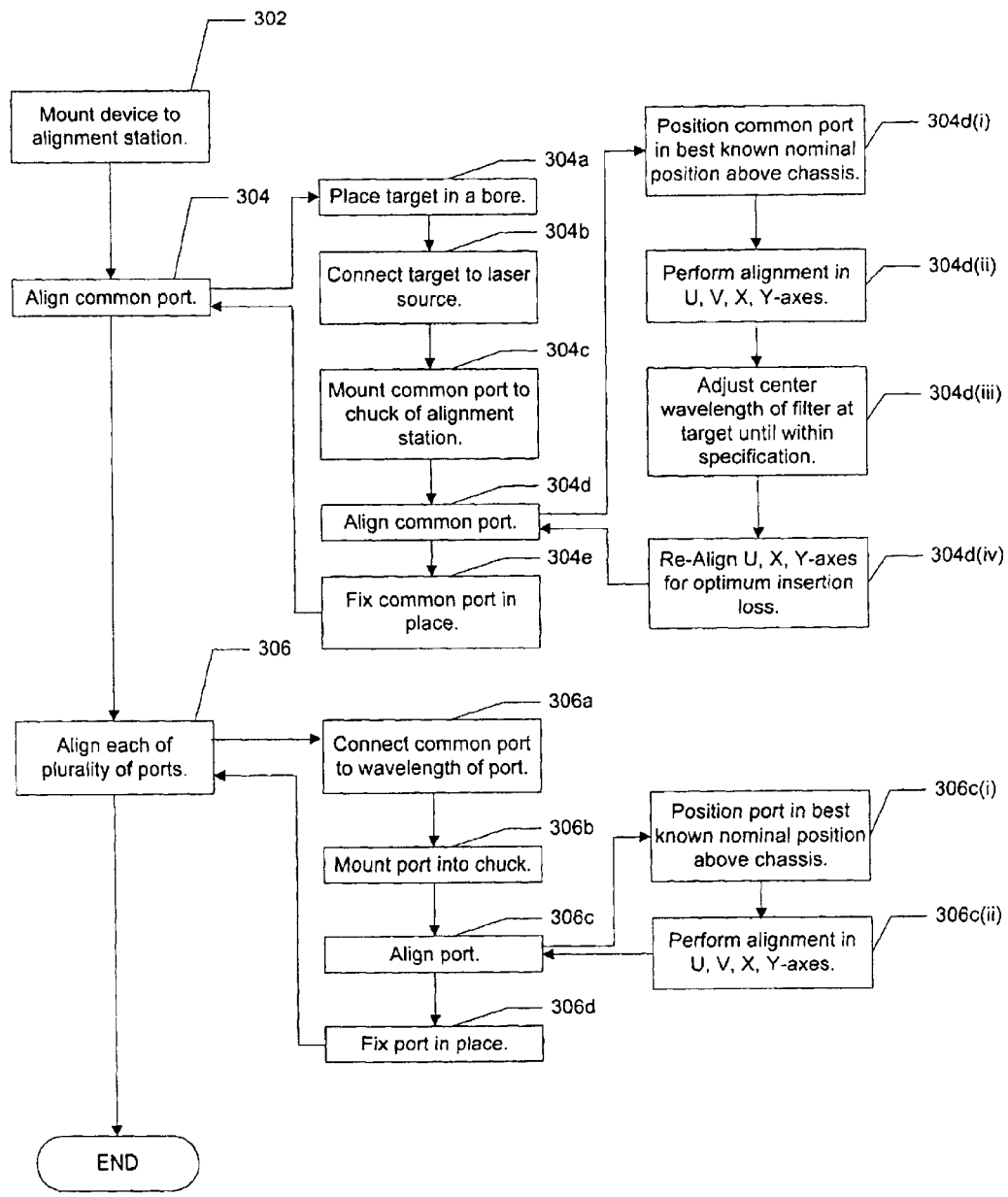
FIG. 3 is a flowchart illustrating an exemplary embodiment of a method for aligning the ports of the device.

FIG. 3 is a flowchart illustrating an exemplary embodiment of a method for aligning the ports of the device 200. The alignment of the device 200 is accomplished in two parts, with an alignment of the common port 202 and alignments of each of the other ports 204a–204d. First, the device 200 is mounted to an alignment station, via step 302. Next, the common port 202 is aligned, via step 304.

In aligning the common port 202, a target is first placed in one of the bores, such as bore 220d, via step 304a. The target can be a standard collimator that is glued to a sleeve which fits the target in the bore 220d in a nominal position. Next, the target is connected to a laser source, via step 304b, and the common port 202 is mounted to a chuck of the alignment station, via step 304c. The common port 202 is then aligned using an alignment software, via step 304d. The alignment software first positions the common port 202 in the best known nominal position above the chassis 206 (but not in the chassis 206), via step 304d(i), i.e., along the Z-axis. Next, the software performed algorithms that aligns the common port 202 in the U, V, X, and Y-axes, via step 304d(ii). The U-axis rotates about the X-axis, and the V-axis rotates about the Y-axis. The alignment algorithms may include a spiral search algorithm to find an initial start position for alignment with power above a certain threshold and a hill climb algorithm for finding a position with optimized lighting. A surface fitting approach, raster scan or other algorithm may also be provided.

The alignment algorithms may be used to incrementally step through different positions along an axis of motion. The axis is expected to have the greatest impact on alignment may be used first, followed by movement along less significant axes. The process may be iterated until a desired alignment has been achieved.

In the following, the algorithm to align the XYZ position of an optical component is described. The UVZ position may be similarly adjusted. First, a spiral scan or raster scan in the U and V axes may be used to find a power reading above some threshold. After the threshold is reached, a 2-dimension auto alignment algorithm is run to align XY position to the maximum power. The 2-dimension auto alignment algorithm may include: Spiral Scan, Raster Scan, XYZ Hill Climb, and YXY Hill Climb.

For the Hill Climb algorithm, the following three parameters are specified: initial step size, number of check points, and number of iterations. The "step size" is a parameter that determines the magnitude of motion along each axis. "Check points" is the parameter that specifies the number of steps the algorithm takes past each maximum point in order to check to see if the hill would begin to rise again or not. After locating the absolute peak of the hill, the Hill Climber reduces the size of its step size by a factor of two and goes climbing in the reverse direction. The Hill Climber repeats the process and passes over the hill as many times as indicated by a parameter referred to as "iterations". This is done in order to fine tune the alignment. Upon arrival to the top of the peak the next time, the Hill Climber no longer crosses over it and rests at the top. Once the Hill Climb process is completed along one axis, it is repeated along the other axis and after that once again along the first axis.

After the above Hill Climb method is performed, a fine alignment may be performed. While the Hill Climb finds a position with optimal power, the power may drop off much more rapidly by movement in one direction along the axis rather than the other direction. In such cases, it may be desirable to center the alignment point in between points along the axis where the power starts to drop below a desired threshold (such as 99% of the optimum power found using the Hill Climb method). The Hill Climb method is first completed to determine an initial optimum alignment position. The component is then moved in a positive direction along the first axis. A check is made to see if the power is still above 99% of the initial optimum. If so, the position is recorded and another step is taken along the axis is taken. This continues until the power drops below 99% of optimum. Once the power drops below 99%, the method moves back to the last position that was above 99%. This is recorded as an axis point (X1). This marks the last position before the power drops below the 99% threshold due to movements in the positive direction along the first axis.

Then, the algorithm steps along the axis in the negative direction. A check is made to see if the power remains above 99% of optimum. If so, the position is recorded and another step is taken along the axis in the negative direction. This is repeated until the power falls below 99% of optimum. Once the power drops below 99%, the method moves back to the last position that was above 99%. This is recorded as an axis point (X2). This marks the last position before the power drops below the 99% threshold due to movements in the negative direction along the first axis. The mid point between X1 and X2 is calculated (i.e., the mid point between the positions along the axis where the power falls below 99% of optimum). This allows for the same alignment error in either direction before the power drops below the threshold. The fine alignment is then repeated for the other axes. The fine alignment repeats in the same manner as the Hill Climb algorithm. The first axis and second axis are aligned and then the first axis is aligned again. For a three axis alignment, the third axis is then aligned and alignment of the first axis, second axis and first axis are then repeated again. For a four axis alignment, the third axis and fourth axis are aligned. Then the third axis is aligned again. Alignment of the first axis, second axis and first axis are then repeated again.

This alignment process is further described in the co-pending U.S. patent application titled "System and Method For Optical Multiplexing and/or Demultiplexing", Ser. No. (2200CIP), filed on Jul. 26, 2002, assigned to the assignee of the present application. This co-pending application is hereby incorporate herein by reference.

Once the common port 202 is aligned along the U, V, X, and Y axes, the center wavelength of filter 204d at the target is next adjusted until it is within the specifications, via step 304d(iii). The center wavelength of the filter 208d is a direct result of the angle of incidence of the laser beam from the target's laser source on the filter 208d. The center wavelength of the filter 208d can thus be adjusted by adjusting the angle of incidence. Next, the V angle of the common port 202 is adjusted until the center wavelength is also within the specification, via step 304d(iv). Once the common port 202 is aligned with the center wavelength within the specification, the common port 202 is fixed in place to the core, via step 304e. The center wavelength may be checked again to ensure that the alignment has been performed correctly.

Once the common port 202 is aligned, the target is removed from the chassis 206. The device 200 is then relocated on the alignment station to positioned it for alignment of the rest of the ports 204a–204d, via step 306. Assume that port 204d is being aligned. First, the common port 202 is connected to a laser source for providing the wavelength corresponding to the port 204d, via step 306a. The port 204d is mounted into the chuck, via step 306b. This port 204d is then aligned using the alignment software, via step 306c. The alignment software first positions the port 204d in the best known nominal position above the chassis 206, via step 306c(i). The alignment of the port 204d for the U, V, X, and Y axes is then performed, via step 306c(ii) in the same manner as with the common port 202 above. Once aligned, the port 204d is fixed in place to the chassis 206, via step 306d. Steps 306a–306d are repeated for each of the other ports 204a–204c.

Figure 4:
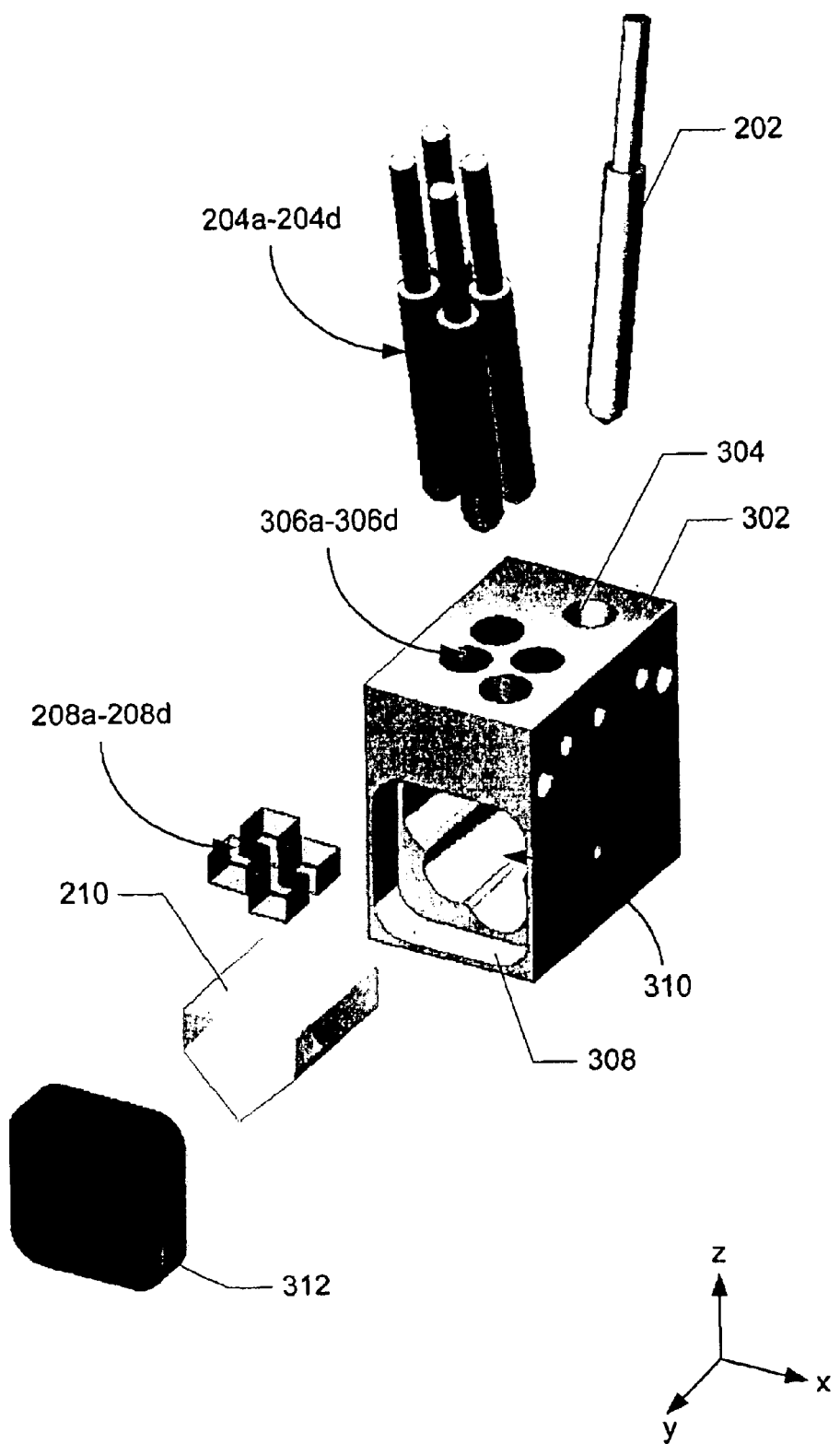
FIG. 4 illustrates another exemplary embodiment of a packaging for the optics of the device.

FIG. 4 illustrates another exemplary embodiment of a packaging for the optics of the device 200. In this illustrated embodiment, the packaging comprises a chassis 404 with a bore 404 for the common port 202 and bores 406a–406d for the ports 204a–204d. However, in the chassis 404, the opening 408 to the cavity 410 is at the side of the chassis 404 rather than the bottom. The core 210 and filters 208a–208d are placed within the cavity 410 through the opening 408 without support from bars 214 or a chassis base 216. A plate 412 can be used to seal the opening 408 using any one of a variety of mechanisms.

Although the exemplary embodiments are illustrated with the demultiplexing and multiplexing of four channels, any number of channels can be supported by the device without departing from the spirit and scope of the present invention.

Figure 5:
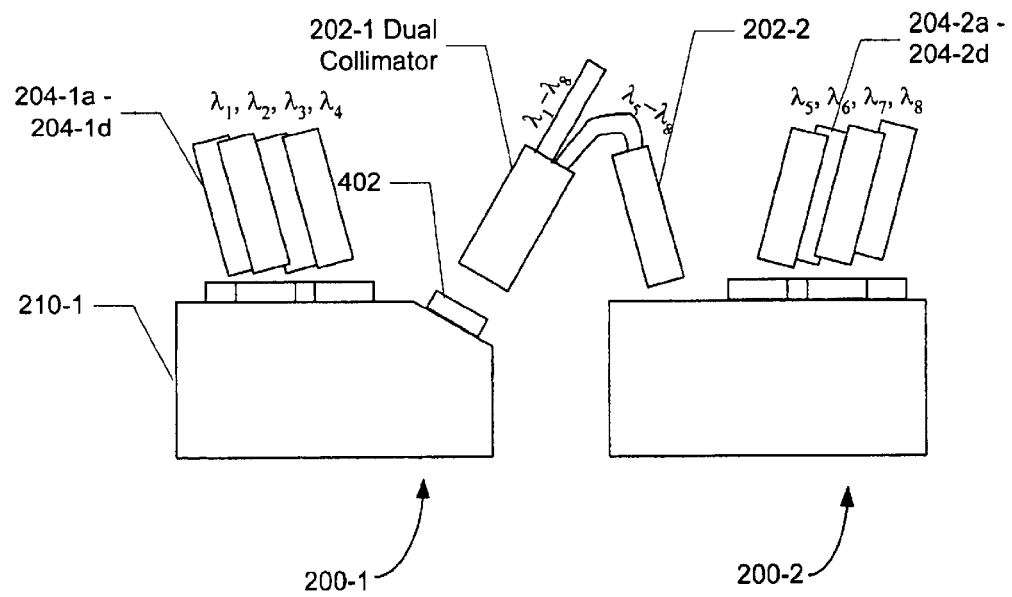
FIG. 5 illustrates an exemplary embodiment of cascading multiplexing/demultiplexing devices.

For example, two or more of the devices 200 can be cascaded to demultiplex or multiplex eight channels. FIG. 5 illustrates an exemplary embodiment of cascading multiplexing/demultiplexing devices 200-1 and 200-2. The first device 200-1 comprises the same optics as the device 200 except the common port 202-1 comprises a dual collimator and the addition of a fifth filter 402 coupled to the core 210-1 and optically coupled to the dual collimator 202-1. The surface of the core 210 at which the fifth filter 402 is coupled can be angled to maintain the proper angle for the beam traversing between the core 210 and the dual collimator 202-1.

A beam with eight channels $\lambda_1$–$\lambda_8$ is input into the first device 200-1 from the input of the dual collimator 202-1. The fifth filter 402 transmits channels $\lambda_1$, $\lambda_2$, $\lambda_3$, and $\lambda_4$, which are demultiplexed and exit the first device 200-1 through ports 204-1a, 204-1b, 204-1c, and 204-1d, respectively. The fifth filter 402 also reflects the remaining channels $\lambda_5$–$\lambda_8$ to the output of the dual collimator 202-1. The channels $\lambda_5$–$\lambda_8$ are input into the second device 200-2. The second device 200-2 comprises the same optics as the device 200. The channels $\lambda_5$, $\lambda_6$, $\lambda_7$, and $\lambda_8$ are demultiplexed and exit the second device 200-2 through ports 204-2a, 204-2b, 204-2c, and 204-2d, respectively.

When multiplexing, the channels $\lambda_1$, $\lambda_2$, $\lambda_3$, and $\lambda_4$ are input into the first device 200-1 via the ports 204-1a, 204-1b, 204-1c, and 204-1d, respectively. These channels are multiplexed and transmitted to the fifth filter 402. The channels $\lambda_5$, $\lambda_6$, $\lambda_7$, and $\lambda_8$ are input into the second device 200-2 via the ports 204-2a, 204-2b, 204-2c, and 204-2d, respectively. These channels are multiplexed and transmitted to the fifth filter 402 of the first device 200-1 via port 202-2 and the dual collimator 202-1. The channels $\lambda_5$–$\lambda_8$ are reflected by the fifth filter 402 to the output of the dual collimator 202-1, while channels $\lambda_1$–$\lambda_4$ are transmitted through the fifth filter 402 to the output of the dual collimator 202-1. A multiplexed beam comprising $\lambda_1$–$\lambda_8$ results.

Although the exemplary embodiments are described above as operating as a multiplexer and a demultiplexer, the device 200 may be used to perform other functions, such as an optical add/drop module, without departing from the spirit and scope of the present invention.

An optical subassembly with an improved port configuration has been disclosed. The device utilizes a core comprising a first face and a second face, where the first and second faces are coupled, non-parallel, and non-co-planar for changing a path of a beam. The core further comprises a third face, to which are coupled a plurality of filters. An axis of the core is defined by the intersection of the first and second faces of the core. The light path traverses between the first or second face and each filter, such that, at each filter, no portion of the light path interferes with any other portion of the light path. Also, the light path traverses the core in a direction along this axis. This is facilitated by the light path traversing an external surface of a filter at an angle. In an exemplary embodiment, the core reflects beams such that channels to be multiplexed or demultiplexed enter and exit the device at the same side. In an exemplary embodiment, the core has a prismatic shape with a base face and coated side faces. Filters are coupled to the base face with adjustable ports comprising collimators optically coupled to the filters. The side faces reflect channels so that they travel down the core and exit or enter the device via the adjustable ports.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. An optical device, comprising:
   a core, comprising a first face, a second face, and a third face, the first and second faces being coupled, non-parallel, and non-co-planar, and an intersection of the first and second faces defining an axis; and
   a plurality of filters coupled to the third face, such that a light path traverses between the first or second face and each filter such that at each filter, no portion of the light path interferes with any other portion of the light path and the light path traverses the core in a direction along the axis.

2. The device of claim 1, wherein the light path traverses an external surface of each filler at an angle.

3. The device of claim 2, wherein the angle is approximately 10° relative to an axis normal to the external surface.

4. The device of claim 1, further comprising:
   a common port optically coupled to the core; and a plurality of ports, each port of the plurality of ports optically coupled to one of the plurality of filters.

5. The device of claim 4, wherein the common port and the plurality of ports reside at a same side of the device.

6. The device of claim 4, wherein the common port and the plurality of ports each comprise a collimator and a position of each collimator is adjustable.

7. The device of claim 4, further comprising an additional filter coupled to the core and optically coupled to the common port, the common port comprising a dual collimator.

8. The device of claim 1, wherein the core comprises a prism, the third face comprises a base face of the prism and the first and second faces comprise a plurality of reflective side faces of the prism.

9. The device of claim 1, wherein each filter of the plurality of filters is operable to transmit one channel of a plurality of channels of a light path and reflect other channels of the light path.

10. An optical multiplexing device, comprising:
a core, comprising a plurality of reflective faces;
a plurality of ports optically coupled to a side of the core, each port operable to transmit one of a plurality of channels;
a plurality of filters coupled to the core, each filter corresponding to one of the plurality of channels and each filter optically coupled to the port that transmits a corresponding channel such that each of the plurality of filters transmits the corresponding channel to one of the plurality of reflective faces and each channel is reflected to a common port such that the plurality of channels is multiplexed; and
the common port being optically coupled to the side of the core, for receiving the multiplexed plurality of channels.

11. The device of claim 10, wherein the core comprises a glass prism, comprising a base face and the plurality of reflective side faces.

12. The device of claim 11, wherein the plurality of filters is coupled to the base face of the core, such that the plurality of ports is optically coupled to the plurality of filters at a side opposite to the base face, and the common port is optically coupled to the base face of the core.

13. The device of claim 10, wherein the plurality of reflective faces comprises a first face and a second face,
the first and second faces being coupled, non-parallel, and non-co-planar for changing a path of a light, an intersection of the first and second faces defining an axis,
the plurality of filters being coupled to a third face of the core,
the light path traversing between the first or second face and each filter such that at each filter, no portion of the light path interferes with any other portion of the light path, and
the light path traverses the core in a direction along the axis.

14. The device of claim 10, wherein the common port and the plurality of ports each comprises a collimator and a position of collimator is adjustable.

15. The device of claim 10, further comprising an additional filter coupled to the core and optically coupled to the common port, the common port comprising a dual collimator.

16. The device of claim 15, wherein the common port and the plurality of ports each comprises a collimator and a position of each collimator is adjustable.

17. An optical demultiplexing device, comprising:
a core, comprising a plurality of reflective faces;
a common port optically coupled to the core at a side of the core for transmitting a beam comprising a plurality of channels to one of the plurality of reflective faces;
a plurality of filters coupled to the core, each filter corresponding to one of the plurality of channels, such that each of the plurality of filters receives a corresponding channel from one of the plurality of reflective faces, and each filter transmits the corresponding channel and reflects any other channel; and
a plurality of ports at the side of the device, each port optically coupled to one of the plurality of filters, such that each port receives the corresponding channel transmitted by the filter.

18. The device of claim 17, wherein the core comprises a glass prism, comprising a base face and the plurality of reflective side faces.

19. The device of claim 18, wherein the plurality of filters is coupled to the base face of the core, the plurality of ports being optically coupled to the plurality of filters at a side opposite to the base face, and the common port being optically coupled to the base face of the core.

20. The device of claim 17, wherein the plurality of reflective faces comprises a first face and a second face,
the first and second faces being coupled, non-parallel, and non-co-planar for changing a path of a light, wherein an intersection of the first and second faces defines an axis,
the plurality of filters being coupled to a third face of the core,
the light path traverses between the first or second face and each filter such that at each filter, no portion of the light path interferes with any other portion of the light path, and
the light path traverses the core in a direction along the axis.

21. The device of claim 17, further comprising an additional filter coupled to the core and optically coupled to the common port, the common port comprising a dual collimator.

22. A method for aligning an optical subassembly, comprising the steps of:
(a) aligning a common port of the subassembly to a target at one of a plurality of ports including:
(a1) aligning the common port along a first axis,
(a2) maintaining the first axis in a first peak position for the common port along the first axis with a substantially highest power and aligning the common port along a second axis,
(a3) maintaining the second axis in a second peak position for the common port and realigning the common port along the first axis, and
(a4) maintaining the second axis in the second peak position for the common port and the first axis in a revised first peak position for the common port and aligning the common port along a third axis; and
(b) aligning each of the plurality of ports to the common port, wherein for each port, the aligning includes:
(b1) aligning each port along the first axis,
(b2) maintaining the first axis in a first peak position for each port along the first axis with a substantially highest power and aligning each port along the second axis,
(b3) maintaining the second axis in a second peak position for the port and realigning the port along the first axis, and (b4) maintaining the second axis in the second peak position for the port and the first axis in a revised first peak position and aligning the port along a third axis.

23. An optical device, comprising:
   a core, comprising a plurality of reflective faces;
   a plurality of ports optically coupled to the core and positioned on a single side of the optical device;
   a plurality of filters, each filter optically coupled between a face of the core and one or more of the plurality of ports; and
   a common port optically coupled to the core and positioned on a same side of the optical device as the plurality or ports.

24. The optical device of claim 23, such that the common port and the plurality of ports each comprise an adjustable collimator, the adjustable collimator adjustable to change a position of a respective collimator.

25. The optical device of claim 23, where one or more of the filters of the plurality of filters is operable to transmit one channel of a plurality of channels and reflect other channels of a light beam incident on a surface of each filter.

26. An optical multiplexing device, comprising:
   a core comprising a glass prism, the glass prism comprising a base face, a first face, and a second face, the first and second faces being coupled, non-parallel, and non-co-planar for changing a path of a light path, and an intersection of the first and second faces defining an axis;
   a plurality of adjustable collimators at a side of the device, each collimator transmitting one of a plurality of channels of light;
   a plurality of filters coupled to the base face of the core, each filter corresponding to one of the plurality of channels of light, each filter being optically coupled to the collimator that transmits a corresponding channel of light, each of the plurality of filters transmitting the corresponding channel to either the first or second face of the core, and each channel being reflected to an adjustable common collimator such that the plurality of channels is multiplexed, such that,
   a light path traverses the core in a direction along the axis, wherein the light path traversing between the first or second face and each filter such that, at each filter, no portion of the light path interferes with any other portion of the light path; and
   the common collimator being located at the side of the device, the common collimator optically coupled to the core for receiving the multiplexed plurality of channels.

27. An optical demultiplexing device, comprising:
   a core comprising a glass prism, the glass prism comprising a base face, a first face, and a second face, the first and second faces being coupled, non-parallel, and non-co-planar for changing a path of a light path, and an intersection of the first and second faces defining an axis;
   an adjustable common collimator optically coupled to the core at a side of the core for transmitting a beam comprising a plurality of channels to the first or second face;
   a plurality of filters coupled to the base face of the core, each filter corresponding to one of the plurality of channels, such that each filter receives a corresponding channel from the first or second face of the core, and each of the plurality of filters transmits the corresponding channel and reflects any other channel, such that,
   a light path traverses the core in a direction along the axis, the light path traversing between the first or second face and each filter such that, at each filter, no portion of the light path interferes with any other portion of the light path; and
   a like plurality of adjustable collimators at the side of the device, each collimator optically coupled to one of the plurality of filters, such that each collimator receives the corresponding channel transmitted by the filter.

28. An optical device, comprising:
   a core including first and second reflective faces and a base face;
   a plurality of ports optically coupled to the base face of the core;
   a plurality of filters, each filter optically coupled between the base face and one or more of the plurality of ports; and
   a common port optically coupled to the base face.

29. The optical device of claim 28, further comprising:
   a plurality of optical fibers, each optical fiber optically coupled to one or more of the collimators.

30. An optical multiplexing device, comprising:
   a core, including first and second reflective faces and a base face, the first reflective face and second reflective face being coupled, non-parallel, and non-co-planar and an intersection of the first and second reflective faces defining an axis;
   a plurality of ports optically coupled to the base face, each port operable to transmit one of a plurality of channels to the core;
   a like plurality of filters, each filter optically coupled between the base face and one of the plurality of ports, each filter operable to transmit a channel of the plurality of channels from a corresponding port to one of the first and second reflective faces and each channel being reflected to a common port such that the plurality of channels are multiplexed; and
   the common port optically coupled to the base face of the core, the common port operable to receive the plurality of channels reflected from the first and second reflective faces.

31. An optical demultiplexing device, comprising:
   a core, including first and second reflective faces and a base face, the first reflective face and second reflective face being coupled, non-parallel, and non-co-planar and an intersection of the first and second reflective faces defining an axis;
   a common port optically coupled to the base face for transmitting a beam comprising a plurality of channels to one of the first and second reflective faces;
   a plurality of filters, each filter optically coupled between the base face and one of the plurality of parts, one or more of the plurality filters operable to transmit a channel of the plurality of channels received from the first and second reflective faces and reflect other channels; and
   a like plurality of ports, each port optically coupled to one filter of the plurality of filters, each port operable to receive the channel transmitted by the filter.

* * * * *